Jan. 14, 1969     R. PHILIPPS     3,422,338
REVERSIBLE CURRENT CONVERTER FOR SELECTIVE DIRECTION
OF CURRENT FLOW THROUGH D.C. LOAD AND INCLUDING
CHOKE COIL WITH UNIDIRECTIONAL
CURRENT FLOW

Filed Sept. 16, 1966     Sheet 1 of 2

INVENTOR.
Reinhard Philipps
BY
Pierce, Scheffler & Parker
Attorneys

United States Patent Office 3,422,338
Patented Jan. 14, 1969

3,422,338
REVERSIBLE CURRENT CONVERTER FOR
SELECTIVE DIRECTION OF CURRENT
FLOW THROUGH D.C. LOAD AND IN-
CLUDING CHOKE COIL WITH UNIDI-
RECTIONAL CURRENT FLOW
Reinhard Philipps, Mannheim-Feudenheim, Germany,
assignor to Aktiengesellschaft Brown, Boveri & Cie,
Baden, Switzerland, a joint-stock company
Filed Sept. 16, 1966, Ser. No. 579,999
Claims priority, application Germany, Oct. 2, 1965,
B 83,974
U.S. Cl. 321—5                                      6 Claims
Int. Cl. H02m 7/70; 7/78

ABSTRACT OF THE DISCLOSURE

A reversible current converter circuit for selectively supplying a load with D.C. current having one direction or the other through the load comprises a rectifier arrangement supplied from an alternating current source and connected to the load, the rectifiers being so controlled as to send current in the desired direction through the load and a choke coil being connected into the converter circuit so that current always flows through it in the same direction regardless of the direction of current flow through the load, the choke thus serving as a direct current smoothing choke, as a ring current choke and as a means for limiting steep voltage rises across the rectifying elements.

---

This invention relates to a reversible current converter, equipped with individual rectifying elements or valves, preferably controllable semi-conductor rectifiers, and having for each direction of the direct current in the load a cascade of two converter units. A cascade can be defined as a series connection of converters of which each forms a so-called commutation group.

If, for example, a cascade is formed from two three-pulse converters, each consisting of three star-connected rectifiers, wherein in one converter the positive and in the other converter the negative poles of the rectifiers are connected and which are inter-connected at the free rectifier ends by connecting leads connected to a three-phase A.C. voltage source, the known three-phase bridge circuit is formed. The rectifiers of each bridge arm have the same polarity. Outside the commutation periods, two series-connected rectifiers are conductive out of the six provided.

A reversible converter requires, as is well known, two cascade arrangements, or two bridge arrangements, with differently poled rectifiers.

It is known that, with reversible converters of which the converter for one current direction is operated as a rectifier and the other is possibly held in inverter control prepared to carry current, ring currents may occur which must be limited by ring current chokes. Although such chokes may be omitted where specific measures assure operation without ring currents, their incorporation is nevertheless desirable, since it ensures that in the case of a control defect, the ring current formed in consequence of this defect, which must be switched off by an overcurrent circuit breaker, remains within certain limits.

In order to produce a smoothed direct current and to prevent an intermittent or broken current, which may occur especially with feeding against a counter-voltage, e.g. of a D.C. machine, it is also necessary to provide a D.C. choke in the D.C. circuit.

Where the reversible converter is equipped with controlled semi-conductor rectifiers, and especially where four-layer semi-conductor rectifiers (thyristors) are used, care must also be taken that the rectifiers which are to be kept blocked are not affected by excessively steep positive blocking voltages, which might cause these rectifiers to strike and give rise to short-circuit-like ring currents. However, it is known that with partial control, there occurs at the end of the commutation of a conducting rectifier, and at the moment of the zero current passage, a more or less high negative blocking voltage. This negative voltage jump appears on the blocked rectifier in counter-parallel circuit as a positive voltage jump. This jump should not exceed a certain maximum permissible steepness.

For suppressing or limiting such positive voltage jumps on the blocked rectifiers, arrangements are provided comprising chokes connected in the rectifier circuits and parallel connected capacitors mostly with series connected resistances. In addition, over-voltage limiters have also been used.

Known current converter circuits have, in order to smooth the direct current, to limit the ring currents, and to suppress or limit the positive voltage jumps at the blocked rectifier valves, differently connected and separately mounted chokes. This entails a not inconsiderable expenditure.

The present invention provides an improved reversible current conveter having for each D.C. current direction at least one cascade of multi-pulse converter units and in which each individual rectifying element associated with one D.C. current direction is paired on the alternating current side with a rectifying element associated with the opposite direction of flow of the direct current, and in which one circuit carrying direct current contains, or several circuits carrying rectifying element currents and belonging to one cascade contain, a choke arrangement with one or more windings carrying current always in the same direction regardless of the operation of the converter and causing a D.C. excitation, so connected that this choke arrangement may function as a direct current smoothing choke, as a ring current choke, and as a means for limiting steep voltage rises across the valves, independent of the operation of the converter.

The invention may be put in practice in various ways and will be further described with reference to the accompanying drawings, in which.

Figure 1:
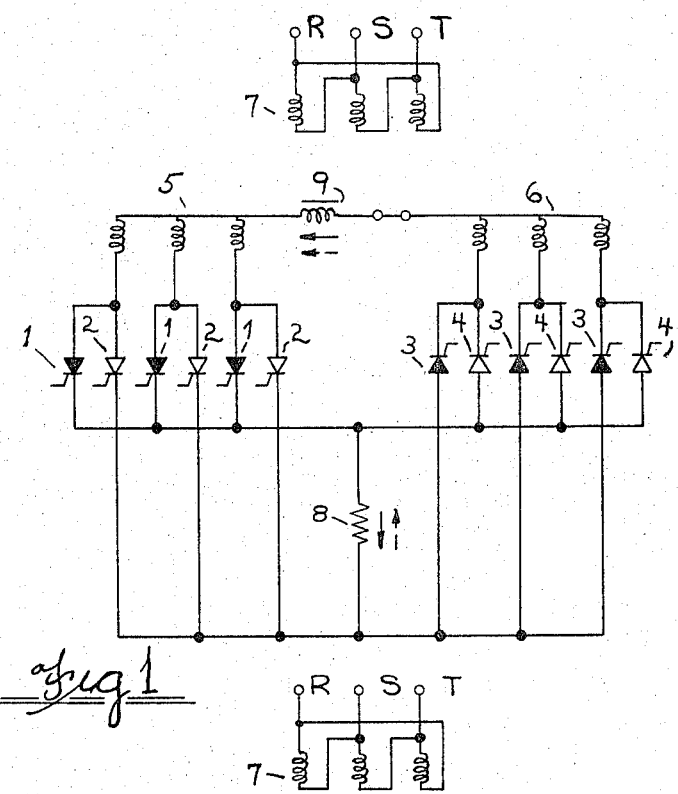
FIGURES 1 to 3 show different embodiments of the invention.

With reference now to FIGURE 1, a reversible converter with two cascades is illustrated, the cascade for one load current direction being shown with solid black, controlled rectifying elements 1, 3 and that for the other current direction being shown with rectifying elements 2, 4 in outline. Each cascade consists of two three-pulse converter units with 180° phase shift of their ignition sequence. In a manner similar to a three-phase bridge circuit, in one converter unit the positive poles of the three controlled rectifiers 1 or 2 are interconnected, whilst in the other converter unit the negative poles of rectifiers 3 or 4 are interconnected. It is known that this offset in the phase position of the converter units has the effect that the D.C. voltage of the series-connected converter units, each with a three-pulse D.C. voltage, becomes combined to form a six-pulse voltage.

The free ends of the rectifiers are connected with respective secondary windings of a transformer having a primary winding 7 and two separate star-connected secondaries 5, 6. The primary is connected to a three-phase mains supply R, S, T. The two cascades are oppositely poled relative to the load 8. Each rectifier 1 is paired on the A.C. side with a rectifier 2, and each rectifier 3 is paired on the A.C. side with a rectifier 4.

In the FIGURE 1 arrangement, the paired rectifiers are poled in the same sense relative to the A.C. supply. The D.C. load 8 of the converter is connected between the star points of the rectifiers whilst a choke arrangement 9 having the form of a D.C. choke with one winding, is connected between the star points of the two secondaries 5, 6. A switch 10 is connected in series with choke 9. Conveniently, the secondary windings are such that they have a comparatively large leakage so that they are adequately decoupled magnetically.

The two directions of the direct current are indicated by solid and dotted arrows, respectively. It may be seen that the direction of the direct current in the choke arrangement remains unchanged. The choke arrangement 9 is connected in the D.C. circuit and acts therefore as a smoothing choke. In addition, however, it is also located in the rectifier circuits in which a ring current can occur. Finally it is also so arranged that any possible positive steep voltage rises at the blocked rectifier valves are limited.

Figure 2:
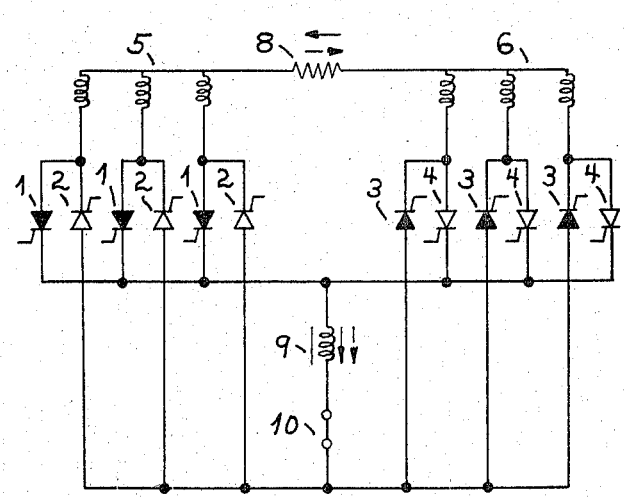

The reversible converter according to FIGURE 2 comprises a similar cascade arrangement with two three-pulse converter units with cascaded rectifiers 1, 3 and 2, 4 respectively, as in FIGURE 1. Also here, the free ends of the valves are again connected to the two secondaries 5, 6 of a transformer whose primary winding 7 is connected to a three-phase mains supply R, S, T.

However, in the FIGURE 2 arrangement, the paired individual rectifiers 1, 2 and 3, 4 have opposite polarities. In addition, the choke arrangement 9, again in the form of a D.C. choke with one winding, is connected between the star points of the converter units whilst the D.C. load 8, is connected between the star points of the two secondaries.

Figure 3:
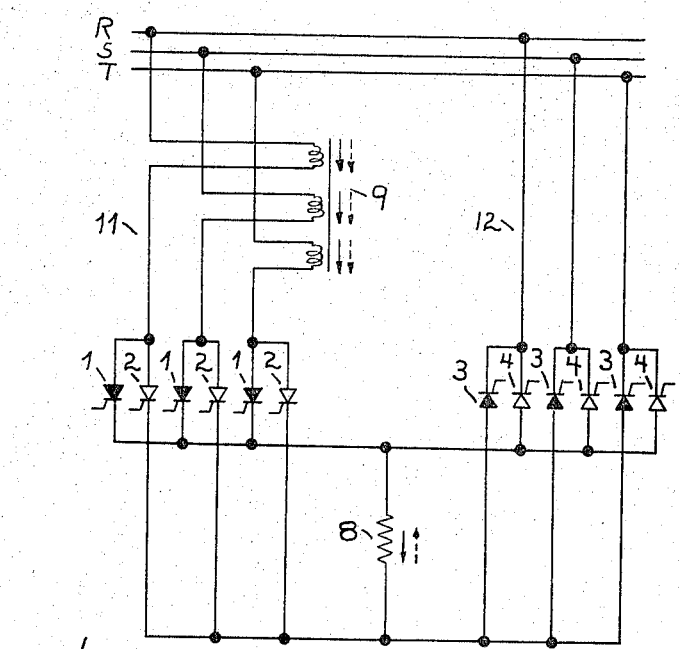

FIGURE 3 shows a reversible converter circuit having the special feature of requiring no transformer so that the converter can be directly connected to the three-phase alternating current supply R, S, T.

Also here, the converter consists of two cascades of two three-pulse converter units. As in FIGURE 1, the paired rectifiers 1, 2 and 3, 4 respectively, have the same polarity. Accordingly, the D.C. load 8 is connected between the rectifier star points.

The A.C. supply to the ingoing converter units (rectifiers 1, 2) from the three-phase network R, S, T is by way of leads 11 while that to the outgoing converter units (rectifiers 3, 4) is by way of leads 12. In each lead 11 is connected one winding of a choke arrangement 9 consisting of three windings with a common iron core. Since the sum of the three winding currents corresponds at all times to the direct current, the choke core undergoes a D.C. excitation. Thus, the effect of the choke arrangement is the same as in the circuits of FIGURES 1 and 2, both as concerns the direct current and the ring current in the rectifier circuits, and with regard to the voltage limitation at the blocked rectifiers.

Figure 4:
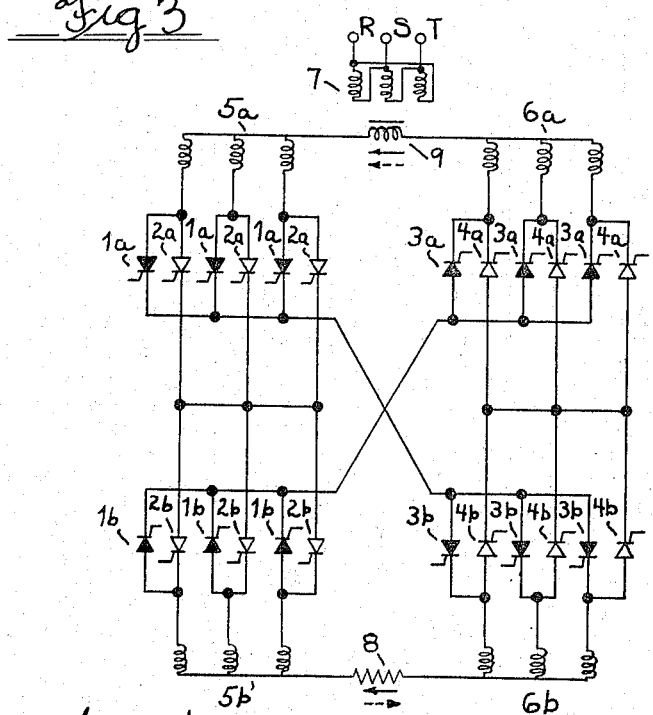
FIGURE 4 shows a further embodiment derived from the circuits of FIGURES 1 and 2.

The circuits shown in FIGURES 1 to 3 do not exhaust the possibilities of the present invention. FIGURE 4 shows a convenient further development of these circuits, serving to produce higher direct voltages with correspondingly larger numbers of individual rectifiers.

This circuit comprises a combination of the circuits of FIGURES 1 and 2 in such a way that the D.C. voltage across the D.C. load 8 is the sum of the partial D.C. voltages. A single D.C. choke 9 with one winding is provided.

The converter arrangement of FIGURE 4 comprises two cascades for each current direction. These are connected to four, star-connected secondary windings 5a, 6a, and 5b, 6b, of the transformer, which is equipped with these four secondaries and one common primary winding 7 supplied from the three-phase network R, S, T.

The paired rectifiers 1a, 2a, and 3a, 4a have the same polarity as in FIGURE 1, whilst the paired rectifiers 1b, 2b, and 3b, 4b have opposite polarities as in FIGURE 2. The rectifiers of the four converter units appertaining to the same D.C. direction are connected in series. The choke arrangement 9 is mounted between the star points of the secondary windings 5a, 6a of the first cascades, the D.C. load 8 between the secondary winding star points of the second cascades. The operation of this circuit is obvious from the accompanying drawing and need not to be described in detail.

I claim:

1. In a reversible current converter circuit for selectively supplying a load with D.C. current having one direction or other through the load, the combination comprising for each direction of current flow through the load at least one cascade of multi-pulse converter units, each individual rectifying unit in said cascade associated with one direction of current flow through the load being paired on the alternating current side with a rectifying element associated with the opposite direction of current flow through the load, and a choke arrangement including a winding thereon connected into said converter circuit such that the current therethrough causing D.C. excitation always flows in the same direction regardless of the direction in which the D.C. current flows through the load whereby said choke functions as a direct current smoothing choke, as a ring current choke and as a means for limiting steep voltage rises across said rectifying elements.

2. A reversible converter as claimed in claim 1, wherein each cascade consists of two three-pulse converter units with 180° electrical phase shift of their ignitions, whose A.C. supply is effected from respective star-connected secondary windings of a transformer whose primary winding is connected to a three-phase current supply, wherein the paired rectifying elements have the same polarity, and wherein the D.C. load of the converter is connected between the star points of the converter units whilst the choke arrangement is connected between the star points of the two secondary windings.

3. A reversible converter as claimed in claim 1, wherein each cascade consists of two three-pulse converter units with 180° phase shift of their ignition, whose A.C. supply is effected from respective star-connected secondary windings of a transformer whose primary winding is connected to a three-phase current source, wherein the paired rectifying elements are oppositely poled, and wherein the choke arrangement is connected between the star points of the converter units whilst the D.C. load is connected between the star points of the two secondary windings.

4. A reversible converter as claimed in claim 1, wherein each cascade consists of two three-pulse converter units with 180° electrical phase shift of their ignition, whose A.C. supply is effected through separate leads from a three-phase current supply, wherein the paired rectifying elements have the same polarity, wherein the D.C. load of the converter is connected between the star points of the converter units, and wherein the choke arrangement consists of three windings on a common iron core, each winding being connected in a respective one of the supply leads of one converter unit of the two cascades.

5. A reversible converter as claimed in claim 1, consisting of two cascades each for the two directions of flow of the direct current, whose converter uints are connected on the A.C. side to the star connected secondary windings of a transformer having four secondaries and one primary winding, the paired rectifying elements of the converter units of a first two cascades having the same polarity and the paired rectifying elements of the converter units of the two other cascades being oppositely poled and the individual rectifying elements belonging to the same current direction being connected in series, and wherein the choke arrangement is connected between the star points of the secondary windings of the said first two cascades and the D.C. load is connected between the star points of the secondary windings of the said other two cascades.

6. A reversible converter as claimed in claim 1 and which further includes a switch connected in series with the choke arrangement.

References Cited

UNITED STATES PATENTS 1,939,429 12/1933 Alexanderson _____ 321—7
1,999,013 4/1935 Acheson _____ 321—27 X JOHN F. COUCH, *Primary Examiner.*

W. H. BEHA, JR., *Assistant Examiner.*

U.S. Cl. X.R.

321—10, 27